(12) United States Patent
Corradini et al.

(10) Patent No.: US 10,641,178 B2
(45) Date of Patent: May 5, 2020

(54) FIRE PROTECTION OF A FAN CASING MADE OF COMPOSITE

(71) Applicant: SNECMA, Paris (FR)

(72) Inventors: Sylvain Corradini, Moissy-Cramayel (FR); Timothee Elisseeff, Moissy-Cramayel (FR); Sophie Essayan, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 582 days.

(21) Appl. No.: 15/110,391

(22) PCT Filed: Jan. 8, 2015

(86) PCT No.: PCT/FR2015/050041
§ 371 (c)(1),
(2) Date: Jul. 7, 2016

(87) PCT Pub. No.: WO2015/104504
PCT Pub. Date: Jul. 16, 2015

(65) Prior Publication Data
US 2016/0333789 A1 Nov. 17, 2016

(30) Foreign Application Priority Data
Jan. 9, 2014 (FR) .................................. 14 50145

(51) Int. Cl.
*F02C 7/25* (2006.01)
*F01D 25/24* (2006.01)
*F04D 29/52* (2006.01)

(52) U.S. Cl.
CPC ................ *F02C 7/25* (2013.01); *F01D 25/24* (2013.01); *F04D 29/526* (2013.01);
(Continued)

(58) Field of Classification Search
CPC ...... F02C 7/24; F02C 7/30; F02C 7/32; F02C 7/20; F02C 7/25
(Continued)

(56) References Cited

U.S. PATENT DOCUMENTS

| 4,534,698 A | * | 8/1985 | Tomich | ................. F01D 21/045 |
| | | | | 415/121.2 |
| 2008/0199301 A1 | * | 8/2008 | Cardarella, Jr. | ...... F01D 21/045 |
| | | | | 415/9 |
| 2013/0153456 A1 | * | 6/2013 | Zhu | ......................... B29C 70/08 |
| | | | | 206/521 |

FOREIGN PATENT DOCUMENTS

| EP | 2447508 A2 | 5/2012 |
| FR | 1256850 A | 2/1961 |

(Continued)

OTHER PUBLICATIONS

French Search Report with English Language Translation Cover Sheet, dated Oct. 1, 2014, FR Application No. 1450145.
(Continued)

*Primary Examiner* — Ninh H. Nguyen
*Assistant Examiner* — Jason Mikus
(74) *Attorney, Agent, or Firm* — Womble Bond Dickinson (US) LLP

(57) ABSTRACT

Method (S) for protecting against fire a fan casing (1) comprising a roughly cylindrical barrel (10) having a main direction extending along a longitudinal axis (X) and an upstream flange (20) extending radially with respect to the longitudinal axis (X) from an upstream end of the barrel (10), the fan casing (1) being made of a composite comprising a fibrous reinforcement densified by a matrix, said matrix being polymerized, the protection method(S) comprising the following steps:•—laying (SI) widths containing glass fibre pre-impregnated with a resin capable of affording the fan casing with thermal protection against fire on an (Continued)

upstream radial face (22) of the upstream flange (20), and
• —polymerizing (S2) the resin in order to obtain a protective layer (2).

15 Claims, 1 Drawing Sheet

(52) U.S. Cl.
CPC .... *F05D 2240/15* (2013.01); *F05D 2300/603* (2013.01); *Y02T 50/672* (2013.01)

(58) Field of Classification Search
USPC .......................................................... 415/200
See application file for complete search history.

(56) References Cited

FOREIGN PATENT DOCUMENTS

| | | |
|---|---|---|
| FR | 2913053 A1 | 2/2007 |
| GB | 2486404 A | 6/2012 |

OTHER PUBLICATIONS

International Search Report with English language Translation, dated Apr. 21, 2015, PCT Application No. PCT/FR2015/050041.

\* cited by examiner

FIRE PROTECTION OF A FAN CASING MADE OF COMPOSITE

FIELD OF THE INVENTION

The invention relates in general to a gas turbine casing, and more particularly a retention casing for a gas turbine fan for an aircraft engine made of composite material comprising a fiber reinforcement densified by a matrix and its associated production method.

TECHNOLOGICAL BACKGROUND

The fan casing of a gas turbine aircraft engine can fulfil several functions. It defines the air inlet flow path in the engine, supports abradable material relative to the tops of fan blades, supports a structure generally in the shape of acoustic panels for attenuation of sound waves at entry of the engine and incorporates or supports a retention shield for debris projected onto the inner face of the casing, such as ingested objects or debris from damaged blades.

Currently, a fan casing comprises a relatively thin wall defining the air inlet flow path. The casing can especially be made of metal or composite material. For example, it has been proposed in document FR 2 913 053 to make the fan casing of composite material of variable thickness by forming a fiber reinforcement and densification of the reinforcement by a matrix. The fiber reinforcement is formed by winding a fiber texture obtained by three dimensional weaving with varying thickness on a mandrel in superposed layers so as to integrate the retention shield by simple localized thickness increase.

The fiber reinforcement comprises fibers, especially carbon, glass, aramid or ceramic. The matrix as such is typically a polymer matrix, for example epoxide, bismaleimide or polyimide.

The casing can be made in a single piece and comprises flanges at its axial ends. A first flange, called upstream flange, enables fastening of an air inlet sleeve on the casing, while the second flange, called downstream flange, enables connection of the fan casing with an intermediate casing by means of linking members of screw-nut type, with interposition of an annular ferrule applied against the downstream face of the downstream flange. Here, the upstream and the downstream are defined by the direction of flow of gases in the turbine engine. The intermediate casing is made of metal, titanium, in a metal alloy based on titanium or even made of aluminium, along with the annular ferrule and the air inlet sleeve.

In usage, it eventuates that some cases of breakdowns can cause a rise in the temperature surrounding the fan casing, which can harm its proper operation, especially in the event where the fiber reinforcement is formed from a three-dimensional fiber texture. In fact, material currently used for casings made of composite material is not intrinsically self-extinguishable or flame-retardant. Also, fibers oriented in the third direction of the reinforcement maintain the structure and limit its delamination. However, these fibers oriented in the third direction transmit heat of the flame within the material, which benefits maintaining of the flame.

It is therefore necessary to protect the fan casing against these extreme temperatures and more generally against fire by limiting heating of the structure to allow its extinguishing so that the casing is capable of conserving its mechanical properties during and after the rise in temperature and if needed slow down the spread of the fire following withdrawal of the flame.

It has therefore been proposed to connect counter plates made of titanium, a material less sensitive to fire, between the fan casing and the adjacent upstream and downstream pieces. But, this solution increases the overall mass of the engine. Also, production tolerances are considerable due to the production method (hot-forming of the counter plate), which is also difficult to carry out and therefore very costly.

It has also been proposed to connect, by weaving on the preform intended to form the fiber reinforcement, a rigid or semi-rigid braid made of glass fibers, which is then co-injected with the preform of the fan casing. However, this solution proves delicate in terms of maintaining protection during its introduction into the mold. Also, the weaving step proves difficult to perform.

It has also been proposed in document GB 2 486 404 to hot-project copper or a copper alloy onto the outer surface of the barrel of the casing made of composite material so as to diffuse the temperature of the flame and protect the casing against fire.

Finally, document EP 2 447 508 proposes connecting panels made of flame-retardant or insulating material so as to protect a part of an engine. For this purpose, the panels are attached and fixed by way of fastening means to the surface of the part to be protected. But this document fails to specifically address the problem of casings made of composite material.

SUMMARY OF THE INVENTION

An aim of the invention is therefore to improve the protection of a fan casing of a turbine engine made of composite material against extreme temperatures and fire, in an industrializable, reliable and efficient manner.

For this, the invention proposes a fire protection method for a fan casing comprising an overall cylindrical barrel having a main direction extending along a longitudinal axis and an upstream flange radially extending relative to the longitudinal axis from an upstream end of the barrel, the fan casing being made of composite material comprising a fiber reinforcement densified by a matrix, said matrix being polymerized, the protection method comprising the following steps:

draping, on an upstream radial face of the upstream flange, panels comprising prepreg glass fibers with a resin capable of thermally protecting the fan casing against fire, and polymerizing the resin to obtain a protective layer.

Some preferred, though non-limiting, characteristics of the fire protection method for a fan casing described hereinabove are the following:

supplementary panels are also draped on an outer face of the barrel, supplementary panels are also draped on a top of the upstream flange, supplementary panels are also draped against an inner face of the barrel, in a part adjacent to the upstream flange, more supplementary panels are draped on the upstream radial face of the upstream flange than on the inner face of the barrel in the part adjacent to the upstream flange, the supplementary panels are polymerized to form supplementary protective layers against fire, preferably at the same time as the panels are draped on the upstream radial face of the upstream flange, following the polymerization step, the method further comprises a step during which an annular counter plate made of titanium is fixed on a downstream radial face of the upstream flange, the resin comprises an epoxy resin, a phenolic resin and/or a cyanate ester resin, such as a resin of HexPly®M26T/50%035 type, the method further comprises a machining step of the upstream radial face of the upstream flange so as to adjust the thickness of the protective layer, the fan casing further comprising a downstream flange, and the method further comprises a step during which a barrier against galvanic corrosion is applied against a downstream surface of the downstream flange, and the barrier against galvanic corrosion is applied according to the following steps: draping, on a downstream radial face of the downstream flange and optionally on the top, panels comprising prepreg glass fibers with resin capable of protecting the fan casing, and polymerizing the resin to obtain a protective layer.

The invention also proposes a fan casing made of composite material comprising a fiber reinforcement densified by a matrix, said fan casing comprising an overall cylindrical barrel having a main direction extending along a longitudinal axis, an upstream flange radially extending relative to the longitudinal axis from an upstream end of the barrel, and a protective layer on an upstream radial face obtained as per a protection method as described hereinabove.

According to a preferred, though non-limiting, aspect the fan casing described hereinabove further comprises a downstream flange radially extending relative to the longitudinal axis from a downstream end of the barrel and a barrier against galvanic corrosion applied to a downstream radial face.

BRIEF DESCRIPTION OF THE DRAWINGS

Other characteristics, aims and advantages of the present invention will emerge from the following detailed description and with respect to the appended drawings given by way of non-limiting examples and in which.

DETAILED DESCRIPTION OF AN EMBODIMENT

Figure 1:
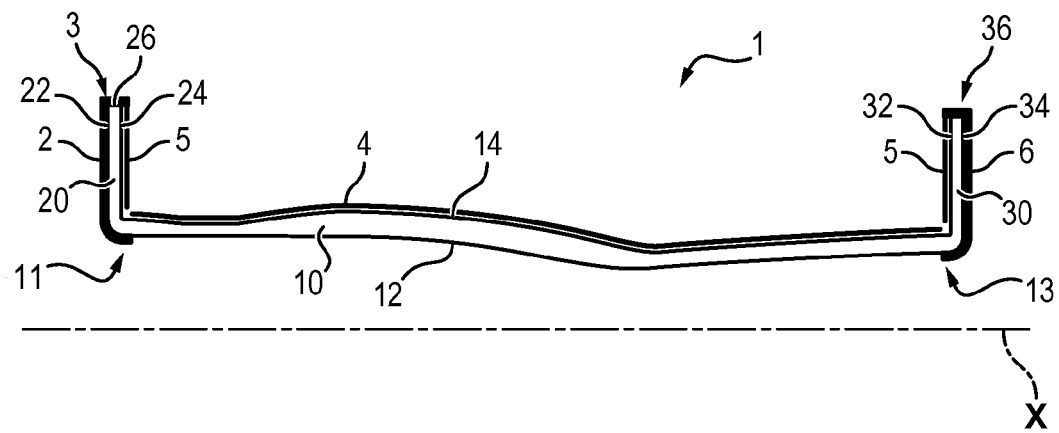
FIG. 1 is a partial view in transversal section of an example of a fan casing according to the invention.
Figure 2:
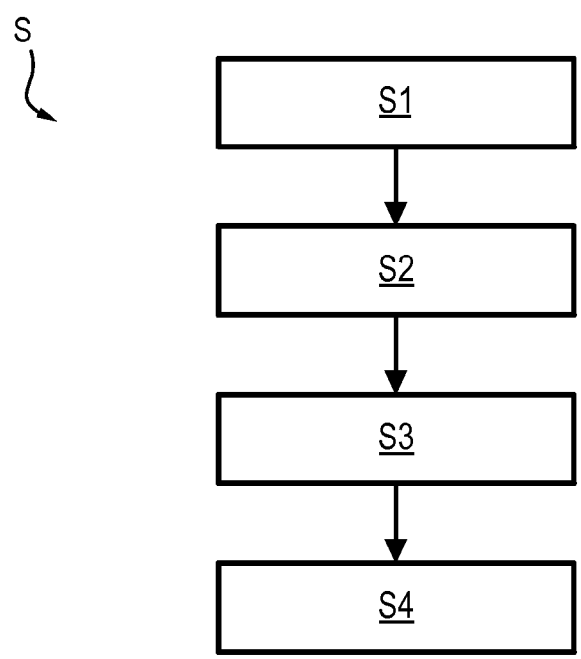
FIG. 2 is a flowchart showing different steps of an exemplary embodiment of the protection method of a fan casing according to the invention.

A gas turbine engine generally comprises, from upstream to downstream in the direction of gas flow, a fan, one or more compressor stages, for example a low-pressure compressor and a high-pressure compressor, a combustion chamber, one or more turbine stages, for example a high-pressure turbine and a low-pressure turbine, and a gas discharge tube.

The turbines are coupled to the compressor and to the fan by respective coaxial shafts.

The engine is housed inside a casing comprising several parts corresponding to different elements of the engine. Therefore the fan is enclosed for example by a fan casing which is connected upstream to an air inlet sleeve and downstream to an annular ferrule of an intermediate casing.

The fan casing 1 comprises an overall cylindrical barrel 10, having a main direction extending along a longitudinal axis X substantially parallel to the gas flow. The barrel 10 of the casing can have a variable thickness, as indicated in document FR 2 913 053, and can be fitted with an upstream flange 20 and a downstream flange 30 at its upstream and downstream ends, respectively, to enable its mounting and its attaching to other parts, including the air inlet sleeve, the intermediate casing or even the annular ferrule.

The upstream flange 20 and the downstream flange 30 are annular in shape and radially extend relative to the longitudinal axis X of the fan casing 1.

The upstream flange 20 comprises an upstream radial face 22 (facing the flow) and a downstream radial face 24 (facing the downstream flange 30). The upstream flange 20 further comprises an annular top 26, extending between the upstream face 22 and the downstream face 24, at a distance from the barrel 10. Similarly, the downstream flange 30 has an upstream radial face 32 (facing the upstream flange 20) and a downstream radial face 34 (facing the upstream face 32). The downstream flange 30 further comprises an annular top 36, extending between its upstream face 32 and its downstream face 34, at a distance from the barrel 10.

Here, the fan casing 1 is made of composite material with fiber reinforcement densified by a matrix. The reinforcement especially comprises fibers of carbon, glass, aramid or ceramic and the matrix is made of polymer, for example epoxide, bismaelic or polyimide.

The reinforcement can be formed by winding onto a mandrel a fiber texture made by three-dimensional weaving with varying thickness as per the description of application FR 2 913 053, the fiber reinforcement constituting a complete fiber preform of the fan casing 1 formed in a single piece with reinforcement parts corresponding to the flanges.

The mandrel comprises an outer surface the profile of which corresponds to that of the inner surface of the casing to be made, and two flanges radially extending from its free ends adapted to form the upstream and downstream flanges of the fan casing 1. By being wound onto the mandrel, the fiber texture matches the profile of the mandrel, such that its end parts form the parts of preforms corresponding to the flanges 20, 30 of the casing 1 by resting on the flanges.

All or part of an inner face 12 of the barrel 10 of the fan casing 1 can be fitted with an insulating coating which can comprise a set of acoustic panels. The set of acoustic panels comprises several juxtaposed panels each extending over a sector of the inner face 12 of the barrel 10. Conventionally, the panels can be formed by an alveolar structure placed between an outer skin applied against inner face 12 of the barrel 10 and an outer multiperforated skin, the alveoli being formed by cells whereof the walls extend substantially radially between the skins. Reference could be made for example to document FR 2 613 773 for more details on these acoustic panels. The acoustic panels can be fixed to the fan casing 1 as is known by means of inserts integrated into the panels and with screws.

To protect the fan casing 1 in the case of excessive rise in temperature likely to harm its proper operation, especially in case of breakdown or fire, a protective layer 2 to 4 forming a barrier to fire covers the sensitive zones of the fan casing 1.

In particular, the protective layer 2 to 4 is configured to limit the extent of the zone degraded by flames and benefits their extinguishing by limiting the range of temperatures and the rate of temperatures of the gas exhausted by degradation from the matrix of the fan casing 1.

In general, it is preferable for a protective layer 2 to 4 to cover all the zones sensitive to fire of the fan casing 1.

The most exposed zone of the fan casing 1 is the upstream radial face 22 of the upstream flange 20. In an exemplary embodiment, a protective layer 2 covers only this face 22.

The Applicant noted that only a small surface sensitive to fire of the fan casing 1 needs to be exposed to fire for the whole of the fan casing 1 to be degraded. So, in an embodiment, any surface of the fan casing 1 likely to be exposed to flames and having a length along the direction X greater than or equal to 2 mm is preferably protected against fire. For example, the top 26 of the upstream flange 20 has an axial length greater than 2 mm, typically of the order of 10 mm. The top 26 of the upstream flange 20, which is effectively likely to be exposed to fire, is therefore preferably covered by a protective layer 3.

The same applies to the outer face 14 of the barrel 10 of the fan casing 1, i.e., the face 14 of the fan casing 1 which extends between the downstream face 24 of the upstream flange 20 and the upstream face 32 of the downstream flange 30, and which can be covered by a protective layer 4.

But because the downstream flange 30 is usually scalloped and therefore intrinsically better protected against fire than the upstream flange 20, it does not necessarily require fire protection and can therefore not be covered by a protective layer. However, the downstream flange 30 can be covered preventively.

The protective layer(s) 2 to 4 are preferably applied directly to the fan casing 1, after it has been made. Typically, the protective layers 2 to 4 can be applied after the step of polymerizaing the matrix which densifies the fiber reinforcement.

For this purpose, panels comprising prepreg glass fibers are draped S1 on the upstream radial face 22 of the upstream flange 20, and if needed on the top 26 of the upstream flange 20 and on the outer face 14 of the barrel 10. The draping is therefore done fresh, i.e., the prepreg glass fiber panels are flexible and have not been polymerized in advance.

Preferably, several panels are superposed so as to each form a protective layer 2 to 4. The number of layers of panels can depend on the dimension of the composite casing, the capacity of the protective layer to delay or at least slow the onset of fire, as well as on the total weight of the layer. For example ten layers of panels can be draped on the upstream radial face 22 of the upstream flange 20.

The panels are then polymerized S2 so as to form the protective layers 2-4. The polymerization step S2 can especially be done under pressure.

The glass fibers are preferably prepreg with a resin capable of thermally protecting the fan casing against fire. By swelling and delaminating, the resin of the prepreg creates an air gap between the protective layer and the piece, reducing the range of temperatures and the gas decomposition rate.

The resin of the prepreg is selected such that polymerization of the panels of prepreg glass fibers S2 on the casing 1 may be carried out at a temperature lower than the degradation temperature of the casing 1 which is of the order of 135° C. Heat treatment is performed at a temperature of the order of 120° C. The resin of the prepreg is such that its glass transition temperature is greater than the engine operating temperature on the zone of the casing 1. The resin can be thermal class 180° C. Then, adhesion of the panels to the fan casing 1 is obtained by polymerizing S2 the resin of the prepreg during a post-cooking step of the fan casing 1 fitted with the panels of prepreg glass fibers (i.e., after the polymerization step of the matrix which densifies the fiber reinforcement of the fan casing 1).

Surprisingly, the Applicant noticed that the use of panels of prepreg glass fibers with resins designated as naturally self-extinguishable (for example resins loaded with ammonium phosphate) are difficult to apply for feasibility reasons, the draping of these panels being very delicate, to protect the fan casing 1 against fire. In fact it eventuates that the best adapted resins are resins capable of swelling under the effect of heat, which creates an insulating air gap by delaminating of the fiber reinforcement of the casing 1 under the effect of heat, reducing heat-transfer within the reinforcement. This avoids excessively rapid damage to the casing 1. The extent of the degraded zone following exposure to fire is therefore more limited and the temperature range is lower than in the case of a fan casing 1 not having such a protective layer 2-4, such that the gas flow discharged by degradation of the resin is lower, which allows the protective layers 2 to 4 to slow down the spread of fire.

By way of non-limiting example, the resin used for the panels can for example comprise an epoxy resin, a phenolic resin and/or a cyanate ester resin, such as a resin of HexPly®M26T/50%035 type. For this resin, polymerization step S2 is conducted under pressure of 3 bars at a temperature of the order of 120° C. to 125° C.

Advantageously, the protective layer 2 simplifies control of the final dimensions of the fan casing 1 and the finishing operations by forming a sacrificial overthickness which can be easily machined without as such damaging the structure of the casing 1, and in particular the upstream flange 20. In fact, the fan casing 1 fitted with the protective layer 2 can optionally undergo a machining step S3 after polymerization step S2 of said protective layer 2. The protective layer 2 can be more or less machined on the upstream face 22 of the upstream flange 20 so as to adjust the final axial dimension (along the direction X) of the fan casing 1 as a function of the imposed dimensional tolerances.

Optionally, a protective layer can also be applied to the downstream face 24 of the upstream flange 20 and to the upstream face 32 of the downstream flange 30. Yet, draping of panels on these faces 24, 32 can prove delicate to carry out. In fact, due to the annular configuration of the flanges 20, 30, the glass panels tend to stretch at the incurved base of the flanges 20, 30 (either at the intersection of the flanges 20, 30 and of the barrel 10), the geometrical characteristics being difficult to control.

According to an embodiment, protection against fire of the downstream face 24 of the upstream flange 20 and of the upstream face 32 of the downstream flange 30 can therefore be achieved by applying, to each of these faces, an annular counter plate 5 which can be made of titanium. The annular counter plate 5 protects the downstream face 24 of the upstream flange 20 and the upstream face 32 of the downstream flange 30 against fire. For each face 24, 32, the shape and dimensions of the annular counter plates 5 are adapted to the shape and dimensions of said corresponding faces 24, 32 so as to ensure proper contact and optimal protection of said faces 24, 32 against fire.

For example, the annular counter plates 5 can be fixed against the corresponding faces 24, 32 during installation, following draping S1 and polymerization S2 steps of the panels of prepreg glass fibers. Preferably, the surfaces on which the titanium counter plates 5 are fixed are overall planar. For this, the downstream face 24 of the upstream flange 20 and the upstream face 32 of the downstream flange 30 can be protected during draping step S1 by adapted templates, placed against said faces 24, 32 at the time of draping S1 of the panels of prepreg glass fibers, which avoids machining operations of faces 24, 32 prior to fastening of the counter plates 5.

In another embodiment, the fan casing 1 can also comprise a barrier 6 against galvanic corrosion formed on the downstream face 34 and optionally on the top 36 of the downstream flange 30 so as to prevent galvanic corrosion of the metallic pieces fixed to the downstream flange 30, such as the intermediate casing or the annular ferrule.

The anticorrosion barrier 6 avoids contact between the metallic pieces and the fiber reinforcement of the fan casing 1, and therefore avoids galvanic corrosion phenomena, without needing any additional modification to the fan casing 1 or metallic pieces.

The barrier against galvanic corrosion 6 can be made by way of a braid, a strip or a spiral of dried glass fibers so as to obtain a protective layer against semi-rigid galvanic corrosion, which is then placed against the downstream radial annular flange of the mandrel prior to application of the fiber reinforcement of the fan casing 1. The matrix is injected into the glass fibers of the barrier 6 and into the reinforcement of the fan casing 1 then polymerized during the polymerization step of the fan casing 1, which directly incorporates the barrier 6 to the fan casing 1. Reference could be made especially to application FR 1256850 in the name of the Applicant for more details on this embodiment.

As a variant, so as to limit the number of production and finishing steps of the fan casing 1, the barrier 6 can be made similarly to the protective layers 2 to 4. In fact, the protective layers 2 to 4 comprise glass fibers which intrinsically form a barrier against galvanic corrosion and therefore protect the metallic pieces which are optionally applied against the fan casing 1. In this alternative embodiment, a protective layer 6 is therefore further formed on the downstream face 34 and optionally on the top 36 of the downstream flange 30 by draping one or more panels of prepreg glass fibers on these faces 34, 36 of the downstream flange 30. It protects against galvanic corrosion and/or thermally against fire, if needed.

It is evident, similarly to the protective layer 2, that the anticorrosion barrier 6 can participate in controlling the final dimensions of the fan casing 1 and the finishing operations by forming a sacrificial overthickness which can be easily machined so as to have the casing 1 conform to imposed dimensional tolerances.

To further improve protection against galvanic corrosion of metallic pieces fixed upstream and downstream of the fan casing 1, the protective layer 2 and/or the barrier 6 against corrosion can cover a part 11, 13 of the inner surface of the barrel 10. These parts 11, 13 of the inner surface of the barrel 10 in fact form water-retention zones which make these parts 11, 13 sensitive to galvanic corrosion.

It is evident the number of layers of panels can vary according to the zones of the fan casing 1, as a function of the preferred level of protection against fire for each zone, the admissible bulk and mass restrictions. For example, on the inner face 12 of the barrel 10, in the parts 11 and 13 adjacent to the flanges 20 and 30, the main function of the protective layer 2 is to limit galvanic corrosion phenomena. The number of layers can therefore be reduced, which also creates a gap with the subjacent acoustic panels. For example, the thickness of the protective layer 4a can be of the order of 0.5 mm in this part 11 so as to make a space of the order of 2.5 mm with the acoustic panel.

The invention claimed is:

1. A fire protection method
the fire protection method comprising the following successive steps:
providing a fan casing comprising an overall cylindrical barrel having a main direction extending along a longitudinal axis and an upstream flange radially extending relative to the longitudinal axis from an upstream end of the barrel, the fan casing being made of composite material comprising a fiber reinforcement densified by a matrix, said matrix having been polymerized,
draping, on an upstream radial face of the upstream flange of the fan casing, panels comprising prepreg glass fibers with a resin capable of thermally protecting the fan casing against fire, the resin of the panels being unpolymerized during the draping step, and
polymerizing the resin of the panels to obtain a protective layer.

2. The fire protection method according to claim 1, wherein supplementary panels are also draped on an outer face of the barrel during the draining step.

3. The fire protection method according to claim 1, wherein supplementary panels are also draped on a top of the upstream flange during the draining step.

4. The fire protection method according to claim 1, wherein supplementary panels are also draped against an inner face of the barrel during the draining step, in a part adjacent to the upstream flange.

5. The fire protection method according to claim 4, wherein, during the draping step, more supplementary panels are draped on the upstream radial face of the upstream flange than on the inner face of the barrel in the part adjacent to the upstream flange.

6. The fire protection method according to claim 2, wherein, during the polymerizing step, the supplementary panels are polymerized to form supplementary protective layers against fire.

7. The fire protection method according to claim 1, further comprising, following the polymerization step, a step during which an annular counter plate made of titanium is fixed on a downstream radial face of the upstream flange.

8. The fire protection method according to claim 1, wherein the resin comprises at least one of the following materials: an epoxy resin, a phenolic resin, a cyanate ester resin.

9. The protection method according to claim 1, further comprising a machining step of the upstream radial face of the upstream flange so as to adjust a thickness of the protective layer.

10. The fire protection method according to claim 1, the fan casing further comprising a downstream flange, and the method further comprises a step during which a barrier against galvanic corrosion is applied against a downstream surface of the downstream flange.

11. The fire protection method according to claim 10, wherein the barrier against galvanic corrosion is applied according to the following steps:
draping, on a downstream radial face of the downstream flange, panels comprising prepreg glass fibers with a resin capable of protecting the fan casing, and
polymerizing the resin of the panels to obtain a protective layer.

12. A fan casing made of composite material comprising a fiber reinforcement densified by a matrix, the fan casing comprising:
an overall cylindrical barrel having a main direction extending along a longitudinal axis and an upstream flange radially extending relative to the longitudinal axis from an upstream end of the barrel, and
a protective layer on an upstream radial face obtained as per a fire protection method according to claim 1.

13. The fan casing according to claim 12, further comprising a downstream flange radially extending relative to the longitudinal axis from a downstream end of the barrel and a barrier against galvanic corrosion on a downstream radial face of the downstream flange.

14. The protection method according to claim 2, wherein, during the polymerizing step, the supplementary panels are polymerized to form supplementary protective layers against fire at the same time as the panels are draped on the upstream radial face of the upstream flange.

15. The protection method according to claim 10, wherein the barrier against galvanic corrosion is applied according to the following steps:
   draping, on a downstream radial face of the downstream flange and on the top, panels comprising prepreg glass fibers with a resin capable of protecting the fan casing, and
   polymerizing the resin of the panels to obtain a protective layer.

* * * * *